(12) United States Patent
Mells

(10) Patent No.: US 6,850,710 B1
(45) Date of Patent: Feb. 1, 2005

(54) METHOD AND APPARATUS OF UTILIZING RF/MICROWAVE AND OPTICAL MIXING TECHNIQUES TO SELECT A GIVEN BAND OF AN OPTICAL TRANSMISSION

(75) Inventor: Bradley N. Mells, Culver City, CA (US)

(73) Assignee: TIP Group, LLC, Lilburn, GA (US)

( * ) Notice: Subject to any disclaimer, the term of this patent is extended or adjusted under 35 U.S.C. 154(b) by 631 days.

(21) Appl. No.: 09/591,692

(22) Filed: Jun. 9, 2000

(51) Int. Cl.[7] ............................................. H04B 10/00
(52) U.S. Cl. ........................ 398/163; 398/91; 398/98; 398/140; 398/141; 398/115; 398/187; 398/185; 398/186; 398/202; 398/204; 398/205; 455/610; 455/609; 455/606; 455/608; 455/611; 455/617; 455/618; 370/1; 370/2; 370/3
(58) Field of Search ............................. 398/163, 91.98, 398/140, 141, 187, 185, 186, 202, 204, 205; 455/610, 609, 611, 606, 608, 617, 618; 370/3, 1, 2

(56) References Cited

U.S. PATENT DOCUMENTS

| | | | |
|---|---|---|---|
| 4,596,052 A | | 6/1986 | Wright et al. ............... 455/619 |
| 4,953,156 A | * | 8/1990 | Olshansky et al. ............ 398/76 |
| 5,016,242 A | * | 5/1991 | Tang ............................. 398/76 |
| 5,023,946 A | | 6/1991 | Yamazaki et al. ........... 458/619 |
| 5,029,306 A | | 7/1991 | Bull et al. .................... 342/368 |
| 5,052,051 A | | 9/1991 | Naito et al. .................. 455/619 |
| 5,134,509 A | * | 7/1992 | Olshansky et al. ............ 398/76 |
| 5,142,402 A | | 8/1992 | Tsushima et al. ............ 359/192 |
| 5,170,275 A | | 12/1992 | Large ........................... 359/192 |
| 5,305,134 A | * | 4/1994 | Tsushima et al. .............. 398/91 |
| 5,323,258 A | | 6/1994 | Tsushima et al. ............ 359/190 |
| 5,339,184 A | | 8/1994 | Tang ............................ 359/124 |
| 5,500,758 A | | 3/1996 | Thompson et al. .......... 359/189 |
| 5,526,158 A | | 6/1996 | Lembo ......................... 359/161 |
| 5,589,970 A | | 12/1996 | Lyu et al. ..................... 359/133 |
| 5,596,436 A | | 1/1997 | Sargis et al. ................. 359/132 |
| 5,680,238 A | | 10/1997 | Masuda ....................... 359/132 |
| 5,701,186 A | * | 12/1997 | Huber ........................... 398/72 |
| 5,896,211 A | * | 4/1999 | Watanabe ...................... 398/76 |
| 5,940,196 A | | 8/1999 | Pichler et al. ............... 359/133 |
| 6,115,162 A | | 9/2000 | Graves et al. ............... 359/173 |

* cited by examiner

*Primary Examiner*—Hanh Phan
(74) *Attorney, Agent, or Firm*—Eliza Stefaniw

(57) ABSTRACT

A method and apparatus are provided for transmitting and receiving multiple RF/microwave subcarriers on a single optical wavelength over an optical link. The method includes the steps of modulating a plurality of RF/microwave subcarrier frequencies with a respective communication signal and modulating an optical carrier wave with the plurality of modulated RF/microwave subcarrier frequencies. The method further includes the steps of detecting the plurality of RF/microwave subcarriers of the optical carrier wave and mixing those subcarriers with a first local oscillator (LO) frequency to create a new heterodyne IF frequency above the highest frequency component of the modulated signal spectrum of the detected subcarriers, filtering an RF/microwave subcarrier frequency of the plurality of detected RF/microwave subcarriers utilizing a bandpass filter at an IF center frequency of the new IF frequency and mixing the filtered RF/microwave subcarrier with a second local oscillator (LO) frequency to derive a difference frequency at a desired center frequency for propagation over the subsequent network element.

4 Claims, 8 Drawing Sheets

METHOD AND APPARATUS OF UTILIZING RF/MICROWAVE AND OPTICAL MIXING TECHNIQUES TO SELECT A GIVEN BAND OF AN OPTICAL TRANSMISSION

FIELD OF THE INVENTION

The field of the invention relates to optical communications systems and, more particularly, to opto-electronic systems for fiber optic communications networks.

BACKGROUND OF THE INVENTION

Methods of transmitting and receiving communications signals over fiber optic networks are known. RF subcarrier division multiplexed (SDM) transmission techniques are also known. Such techniques have been applied to a variety of communications networks, including hybrid fiber optic/coaxial cable (HFC) networks for community antenna television (CATV) distribution. In fact subcarrier division multiplexing is the standard multiplexing technique used in CATV networks today.

The prior use of subcarrier division multiplexing techniques in HFC networks has generally limited the optical bandwidth utilized for the transmission to that of the coaxial cable portion of the network (e.g. 50–750 MHz). This makes sense for the analog amplitude modulation-vestigial sideband (AM-VSB) transmission of television signals where the linearity of the optical system creates an upper limit on the number of subcarrier multiplexed channels that can be transmitted with the required signal quality over the fiber optic portion of the network. Thus, such network implementations benefit from the low loss of the fiber, but fail to exploit the significant bandwidth of the fiber in the distribution of communications signals and services.

Key to the teachings of the prior art has been a belief that the bandwidth of the coaxial cable portion of the network somehow limits the laser bandwidth that can be effectively utilized to deliver services over such a hybrid network. The current industry trend is to provide allocated bandwidth services over the HFC network for applications such as internet, pay per view and telephone. These allocated bandwidth services typically have taken the form of a digital quadrature amplitude modulation (QAM) and do not require the same degree of linearity from the optical system as the AM-VSB signals have required in the past. This fact is generally known, but it is not effectively exploited in modern CATV network architectures.

The substantially relaxed linearity specifications that result from the utilization of digital QAM signals in contrast to the AM-VSB signals can impact the network architecture by two distinctly separate means. One such means is by the wavelength division multiplexing (WDM) of several laser wavelengths, each of which carries an SDM signal containing multiple QAM subcarriers. Since the linearity specifications are somewhat relaxed, these WDM signals can be transmitted over a single fiber provided that the wavelengths are separated at the hub by an optical wavelength division demultiplexing filter prior to combining one of these wavelengths with the optical carrier containing the SDM AM-VSB signals. These two wavelengths can thereafter be transmitted a reasonable distance through the fiber while maintaining the linearity performance required by the AM-VSB system.

It is important to note that in such WDM systems containing SDM digital QAM signals on the optical wavelengths, the prior art has taught the utilization of the RF bandwidth ranging from 550–750 MHz. The RF bandwidth ranging from 50–550 MHz is reserved for the SDM AM-VSB signals, and the upper bandwidth limit of 750 MHz is imposed by the transmission features of the AdI, coaxial cable (and its associated RF amplifier chain). Therefore a mere 200 MHz of optical bandwidth is utilized for the SDM QAM signals. However there is no fundamental reason why such bandwidth should be so limited. This is a restriction imposed by the coaxial cable system, not by the optical system.

The above scenario considers an analog system that carries a combination of AM-VSB signals and QAM signals on the multiplexed analog subcarriers. However, these considerations are equally pertinent to the digital communications system. The main difference is that in the case of the digital system, bandwidth is increased by time division multiplexing (TDM) of multiple digital signals, whereas in the analog system bandwidth is increased by subcarrier division multiplexing of analog subcarriers.

In the digital system the prior art has taught two distinct techniques whereby additional optical bandwidth may be utilized. One such technique comprises the utilization of multiple optical wavelengths and WDM technology. The other technique comprises increasing the bit rate of the TDM signal. Both of these methodologies require substantial upgrades to the network terminal equipment in order to enable the utilization of additional optical bandwidth.

Accordingly it is an object of this invention to provide a means for increasing the utilization of optical spectrum in the fiber optic portion of the network with the minimum impact on the network terminal equipment.

It is a further object of this invention to provide a means for distributing the additional bandwidth created by increasing the utilization of optical spectrum to different portions of the electrical (or optical) network where less total bandwidth is required.

It is a further object of this invention to provide additional utility to the network by enabling the portion of the bandwidth that is to be distributed to a given portion of the network to be remotely selectable by RF and/or optical techniques.

SUMMARY OF THE INVENTION

A method and apparatus are provided for transmitting and receiving multiple RF/microwave subcarriers on a single optical wavelength over an optical link. The method includes the steps of modulating a plurality of RF/microwave subcarrier frequencies with a respective communication signal and modulating an optical carrier wave with the plurality of modulated RF/microwave subcarrier frequencies. The method further includes the steps of detecting the plurality of RF/microwave subcarriers of the optical carrier wave and mixing those subcarriers with a first local oscillator (LO) frequency to create a new heterodyne IF frequency above the highest frequency component of the modulated signal spectrum of the detected subcarriers, filtering an RF/microwave subcarrier frequency of the plurality of detected RF/microwave subcarriers utilizing a bandpass filter at an IF center frequency of the new IF frequency and mixing the filtered RF/microwave subcarrier with a second local oscillator (LO) frequency to derive a difference frequency at a desired center frequency for propagation over the subsequent network element.

Further the disclosed method utilizes RF/microwave (and/or optical heterodyne) mixing techniques to select a given band of frequencies from an optical transmission and thereafter to distribute the selected band over a portion of the network. The method includes the modulation of multiple communications signals (e.g. TDM or SDM) on multiple RF (or microwave) carriers on a single optical wavelength (or multiple optical wavelengths). The method further includes the step of detecting the set of multiple communications signals on multiple frequency bands and then selecting one of the detected bands for distribution over a portion of the network.

In the general case where the transmitted component carries high frequency microwave signals that are outside of the bandwidth of the detector system, the method further includes the step of selecting one (or more) of the microwave signals utilizing optical heterodyne techniques. The optical heterodyne receiver creates a difference frequency within the bandwidth of the detector and shifts the desired microwave signals to that frequency as a result of the optical mixing. This latter case applies to the system wherein multiple optical carriers are used to transmit higher frequency microwave signal components. The RF/microwave analog of the heterodyne receiver applies in the case where a single optical carrier is utilized to transmit multiple high frequency microwave subcarriers.

The advantages of this invention result in significant cost savings to the network provider by enabling bandwidth upgrades while maximizing the utilization of existing terminal equipment on the network. For example, consider the case where a telecom provider may wish to upgrade a metropolitan network from 622 Mbps (OC-12) to 9.952 Gbps (OC-192). The prior art would require the replacement of all OC-12 terminal equipment with OC-48 terminal equipment at a significant cost to the network provider. Conversely this invention enables the utilization of the existing OC-12 infrastructure while increasing the network bandwidth to the equivalent of an OC-192 without the need for conventional WDM techniques. Considering the fact that the cost of the OC-192 terminal equipment is substantially greater than that of the OC-12 equipment, the cost benefits of this approach are clear and apply at every terminal where the full OC-192 bandwidth is not required. Application of conventional WDM techniques to increase the number of OC-12 optical carriers are similarly cost prohibitive in contrast to the invention described herein.

The fact that this invention enables the bandwidth to be remotely selected introduces the additional utility of bandwidth mobility. Thus the bandwidth delivered to any particular point on the network can be remotely adjusted to accommodate actual demand. In other words, if a portion of the network is not too busy, multiple nodes in that area can be served by the a single microwave subcarrier by simply tuning the voltage controlled oscillators (VCO's) that select the microwave band to the same frequency at each of several nodes. The available bandwidth can be concentrated over a different portion of the network where demand is higher by tuning all of the VCO's in the busy area to different frequencies. Later as loading shifts, the VCO tuning can be adjusted to accommodated the change in network loading conditions.

The method described herein applies to RF/microwave carriers that reside on a single optical wavelength or multiple optical wavelengths. In the case where multiple optical wavelengths are utilized, the method further includes the steps of controlling the wavelengths of the optical carriers. Thus the demodulation is accomplished relative to a stable optical frequency.

BRIEF DESCRIPTION OF THE DRAWINGS

FIG. 8a shows the optical spectrum indicating independent communications signal applied to the upper and lower sidebands of the optical and microwave carriers respectively. FIG. 8b shows the local oscillator wavelength that is utilized to demodulate the lower frequency set (i.e., the lower optical sideband). FIG. 8c shows the local oscillator wavelength that demodulates the higher frequency set.

DETAILED DESCRIPTION OF A PREFERRED EMBODIMENT

Figure 1:
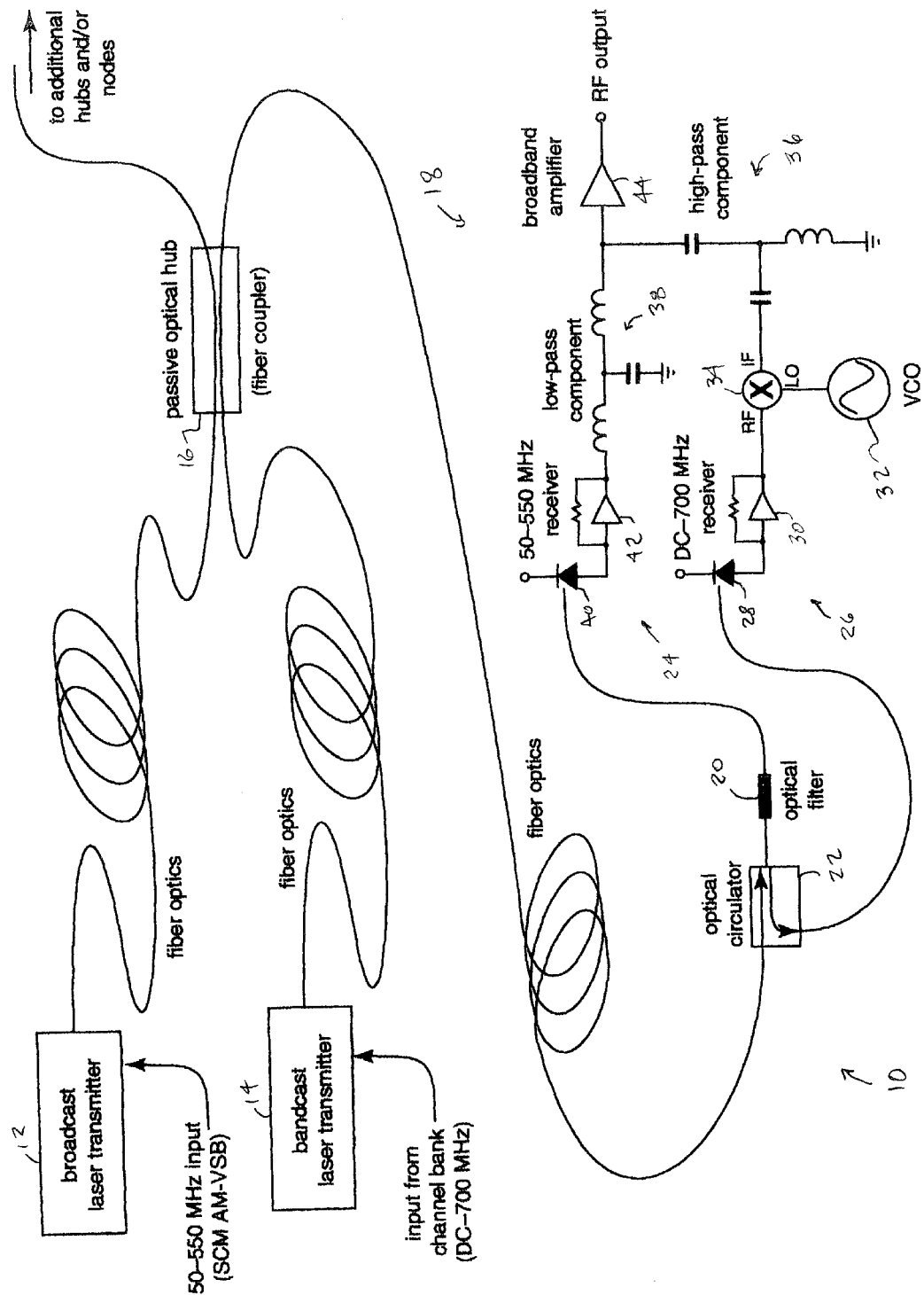
FIG. 1 illustrates an embodiment of the invention applied specifically to the CATV distribution network architecture utilizing SCM techniques to transmit a combination of AM-VSB and digital QAM signals. This preferred embodiment employs analog subcarrier frequencies in the RF range below 700 MHz to transmit the digital QAM signals over the fiber.

FIG. 1 shows a simplified schematic of a transmitter/receiver 10 as it applies to the CATV network architecture. In this embodiment, the CATV broadcast signals are transmitted by a laser transmitter 12 on a first optical carrier and occupy the RF bandwidth from 50–550 MHz. Multiple bands of RF signals are transmitted by a second laser transmitter 14 on the second optical carrier and occupy the RF bandwidth from 0.1–700 MHz. The optical carriers may be produced by high linearity DFB lasers (e.g. Lucent Technologies model 257). The two optical carriers are combined at the first passive optical hub 16 and thereafter may be distributed to several opto-electronic nodes (one node 18 is illustrated in FIG. 1).

Each opto-electronic node 18 contains an optical filter 20 (to separate the two optical wavelengths) and two optical receivers 24, 26 (one for each optical wavelength). The filter 20 passes the first optical carrier to the first receiver 24 and reflects the second carrier. The reflection causes the second carrier to travel back through the optical recirculator 22 to the second receiver 26.

Within the second receiver 26, the second carrier is detected in a detector 28 and amplified in an amplifier 30. An RF/microwave mixer 34 (e.g. such as manufactured by Watkins-Johnson) utilizes a tunable RF oscillator 32 (e.g. Avantek VCO) to select one 200 MHz band from the 700 MHz transmission and shift the center frequency of that selected band to 650 MHz. Thus, the selected 200 MHz band occupies the bandwidth from 550–750 MHz. Any low frequency components of the IF output from the mixer 34 are filtered by a high pass filter 36. Such high pass filter 36 comprises a component of a diplexer, the low-pass component 38 of which passes the 50–550 MHz SCM analog AM-VSB transmission.

The first receiver 24 detects the first carrier in a detector 40. An amplifier 42 amplifies the signal which may then be applied to the low-pass component 38 of the diplexer. The diplexer functions to combine the selected 200 MHz band with the SCM AM-VSB signal. A broadband amplifier 44 amplifies and then distributes the 50–550 MHz broadcast signal along with the selected 200 MHz band of QAM signals over the coaxial cable network (not shown).

It should be noted that in the architecture depicted in FIG. 1, the illustrated embodiment shows the channels in the bandwidth below 700 MHz that are readily available to the CATV network operator at the head-end. However the invention as depicted in FIG. 1 is also pertinent to higher frequency transmissions, for example utilizing a 1.2 GHz bandwidth between 0.8 and 2.0 GHz. In this case more bandwidth is available but the bandwidth below 800 MHz is not used.

The bandwidth limitation arises due to the fact that the IF output from the mixer comprises sum and difference frequencies of the LO and RF frequencies. The situation must be avoided where difference frequencies of one detected band can occur at the same frequency as the sum frequencies from another band. Ultimately, by increasing utilization of spectrum into L-band, a frequency is reached that will result in a difference frequency of 800 MHz that occurs within desired 550–750 MHz band (i.e. when the LO frequency is equal to 1350 MHz). Therefore the highest carrier frequency pertinent to the architecture of FIG. 1 would be 2.1 GHz.

The illustrated embodiment utilizes the spectrum below 700 MHz that is readily available to the network operator. This is consistent with a primary objective of the invention in order to maximize utilization of existing terminal equipment. Nevertheless, it may be desirable to utilize more of the available bandwidth on a given optical carrier at the same time. A modification of the network architecture to enable maximum utilization of the laser bandwidth is shown in FIG. 2.

Figure 2:
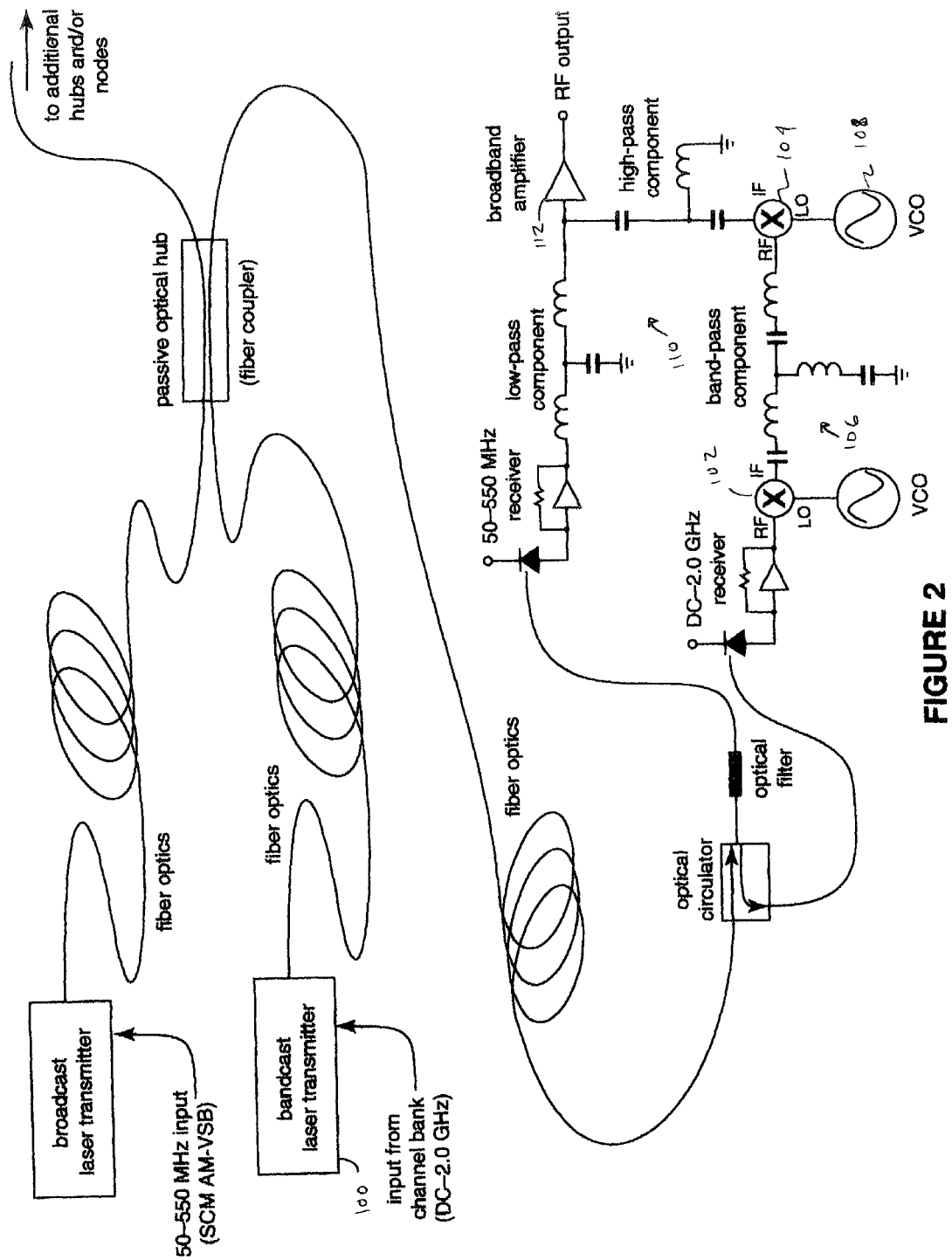
FIG. 2 extends the architecture depicted in FIG. 1 by utilizing more of the optical bandwidth by incorporating analog carriers up to 2.0 GHz for transmitting the digital QAM signals.

The CATV network depicted by FIG. 2 could potentially use all of the available modulation spectrum on a single wavelength. In the example shown a 2000 MHz transmission is implemented within the second transmitter 100. This is well within the modulation bandwidth for direct modulation of the DFB laser junction. To avoid the bandwidth limitations described above, the embodiment of FIG. 2 implements a two stage mixing process. The first stage mixer 102, in combination with a bandpass filter 106, selects the desired 200 MHz band from the transmission and the second mixer 104 shifts that band into the desired 550–750 MHz spectrum.

The selection is accomplished by upconversion of the desired 200 MHz bandwidth within the first mixer 102 to a frequency greater than 2.0 GHz (e.g. 2.4 GHz). The bandpass filter 106 separates the 200 MHz band from the multiple detected frequency bands. After filtering the desired band, a tuned RF oscillator 108 drives the second mixer 104 LO input and thereby tunes the center frequency of the selected band to the appropriate RF frequency, in this case 650 MHz. An RF diplexer 110 thereafter combines the selected 200 MHz band with the 50–550 MHz broadcast signal. The broadband amplifier 112 then distributes the 50–550 MHz broadcast signal along with the selected 200 MHz band over the coaxial cable network connected thereto.

The network topologies described above are specifically applicable to the SCM transmission characteristic of the CATV network. However much of the digital telecommunications infrastructure utilizes TDM techniques to carry amplitude shift keyed (ASK) modulation of binary signals. These systems typically operate at baseband, in contrast to the SCM techniques common in the CATV network architecture. Notwithstanding such differences, the general embodiment of this invention for ASK, FSK, or PSK modulation formats provides substantial benefits to the binary digital network operating at baseband.

Figure 3:
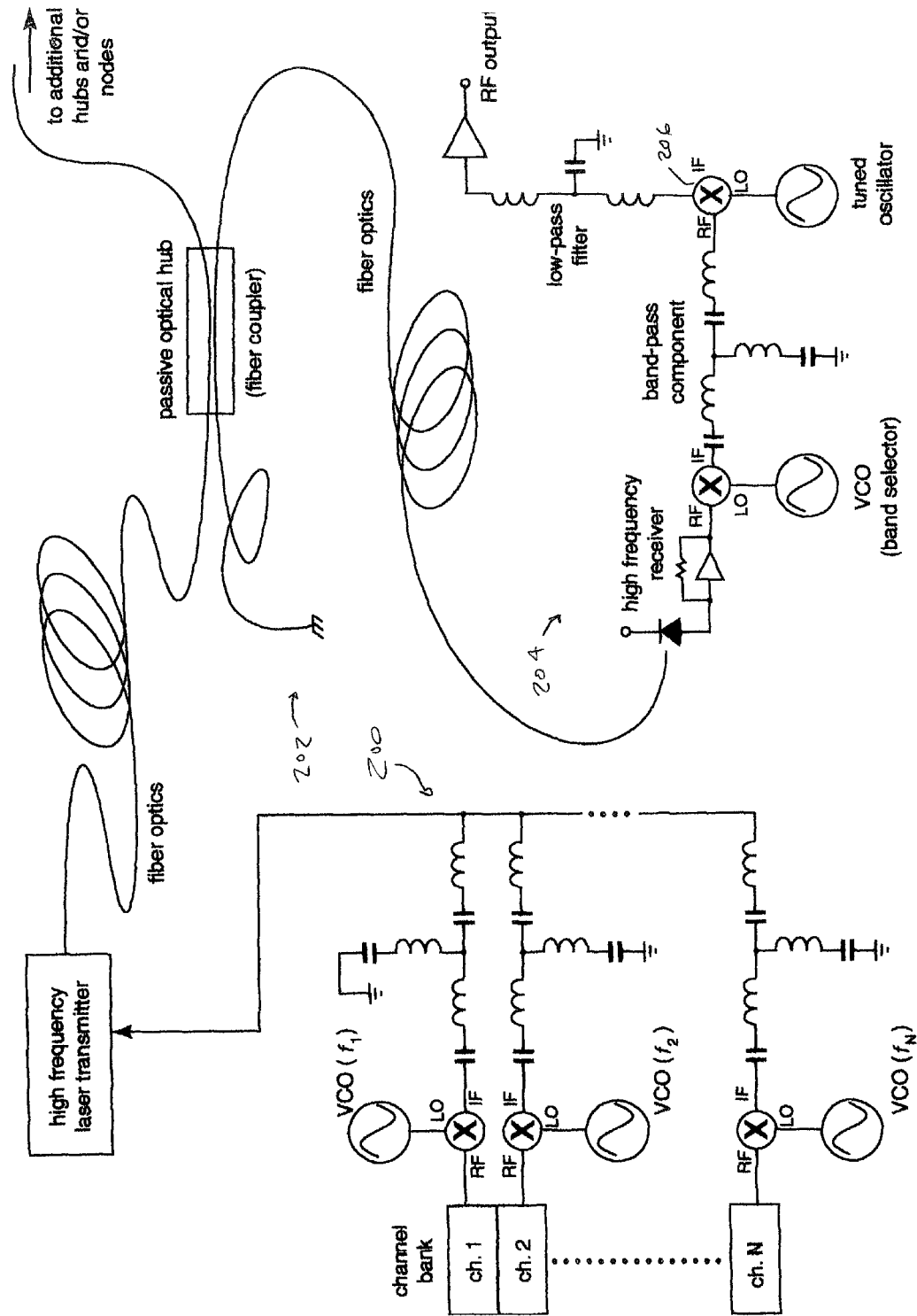
FIG. 3 depicts the network architecture in accordance with a preferred embodiment as it applies to a fiber optic telecommunications network in general. Note that this is an asymmetrical network architecture wherein the transmitter bandwidth exceeds that of the receiver. This generalization of the network architecture is pertinent to digital communications signals (e.g. TDM of amplitude shift keyed binary data) such that the final stage of demodulation is baseband.

FIG. 3 illustrates an embodiment of the invention that may be particularly applicable to telecommunications network topologies that utilize TDM techniques to multiplex binary modulation signals such as ASK. This is a natural extension of the network topology discussed above and it could be successfully applied to SCM signals (provided that operation at baseband is desired). However the network depicted in FIG. 3 does not accommodate the integration of broadcast signals with the SCM digital transmission.

Let us consider the topology of FIG. 3 wherein a high frequency laser transmitter is utilized to distribute multiple lower frequency digital TDM signals. For example an externally modulated 1550 nm DFB laser (e.g. Fujitsu FLD5F6CX utilized with a 10 Gbps modulator manufactured by Uniphase Telecommunications Products) may be incorporated to transmit 16 OC-12 signals over a fiber optic network.

FIG. 3 details the circuit arrangement that may be utilized to combine multiple OC-12 or OC-192 signals. (Note that such a circuit arrangement could be applied to the 2.0 GHz transmission of digital QAM subcarriers described in regard to FIG. 1 by multiplexing ten 200 MHz bandwidth SCM based QAM signals. It is also feasible that the QAM signals may be directly modulated on individual analog carriers up to 2.0 GHz. Furthermore, the externally modulated DFB laser described above may be utilized to increase the bandwidth of the QAM subcarrier frequencies substantially above 2.0 GHz in the CATV network application.)

The transmitter circuit of FIG. 3 utilizes several different oscillator frequencies ($f_1$–$f_N$) to tune the individual OC-12, OC-192 or QAM channels to different microwave carrier frequencies that are subsequently combined by the bandpass filter based multiplexing network 200. The multiplexed communications signals are propagated through a fiber network 202 that may contain optical splitters and optical amplifiers in order to distribute the multiplexed signal to multiple nodes 204 on the network. The high frequency receiver at any given node 204 will detect the entire spectrum of microwave subcarriers and select an individual SCM channel with a VCO based band selector in a manner analogous to that of the CATV receiver described in connection with FIG. 2 above. But in this case, the new IF frequency is shifted to a higher microwave frequency since the highest microwave subcarriers may be above 10 GHz. There is another distinct contrast between the node architectures of FIGS. 2 and 3 as indicated above. Whereas in FIG. 2 the second mixer stage 206 centers the selected band at 650 MHz, the selected channel in FIG. 3 is tuned to baseband.

As the frequency of the microwave subcarriers is increased above 10–20 GHz, it becomes practically much more difficult to implement the architecture depicted in FIG. 3 due to the high microwave frequencies involved. Thus it becomes desirable to utilize optical techniques in order to manage the communications signals at higher frequency microwave subcarriers.

Figure 4:
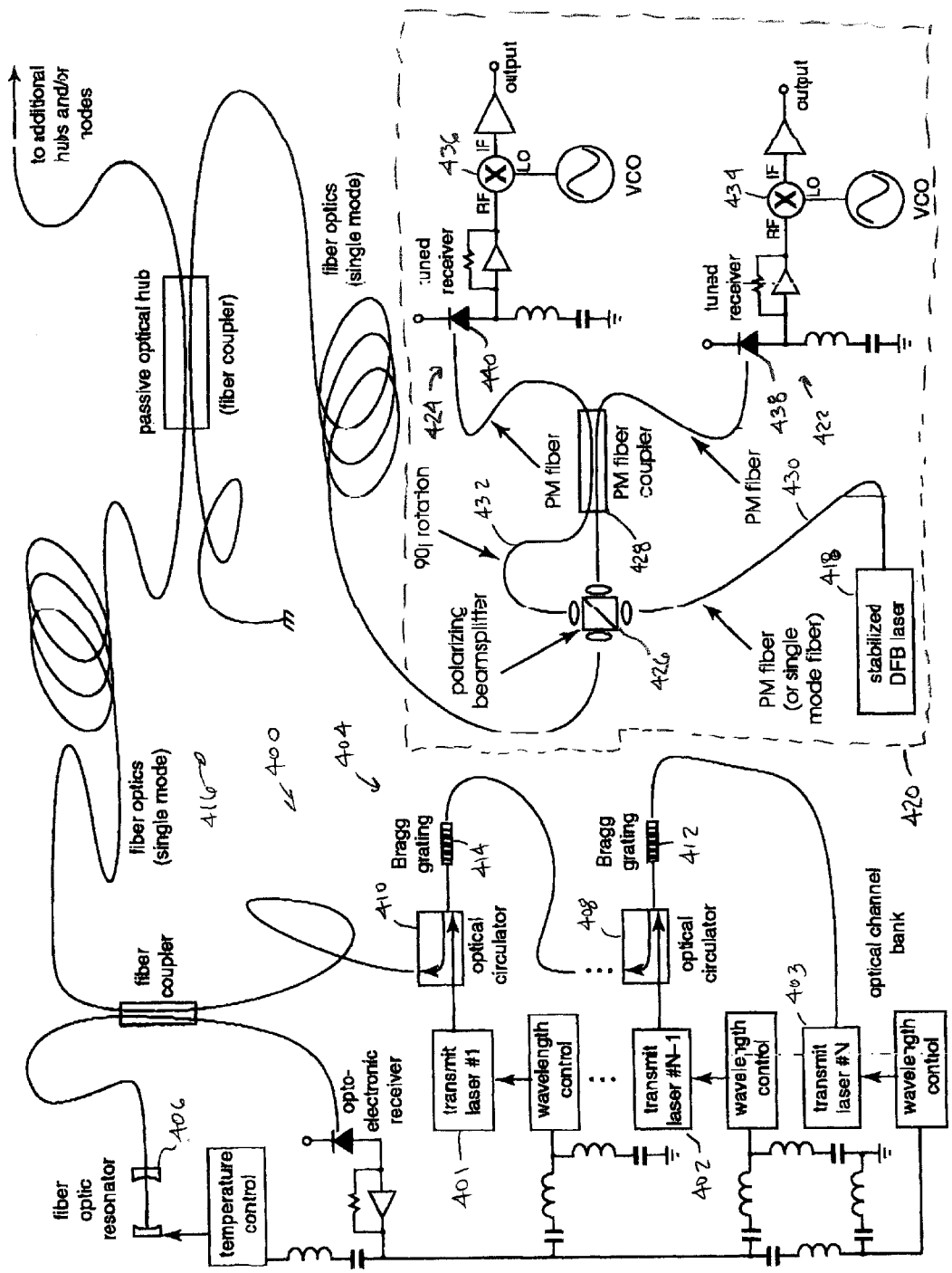
FIG. 4 depicts the heterodyne system in the logical extension of an illustrated embodiment to higher bandwidth where the demultiplexing of multiple optical carrier frequencies is accomplished by incorporating an optical mixer to create an optical beat note by shifting the desired part of the microwave carrier spectrum into the bandwidth of the receiver.

The architecture depicted in FIG. 4 utilizes multiple optical wavelengths to carry the transmission. The transmitter 400 containing the multiple optical sources 401–403 is indicated as the optical channel bank 404. The significant increases in bandwidth made possible by the optically multiplexed transmission reduce the feasibility of utilizing an IF frequency that is above the highest microwave frequency component of the optical transmission. Therefore the optical demultiplexing topology of FIG. 4 incorporates optical heterodyne detection techniques.

In order to realize IF frequencies within the communications bandwidth, adjacent optical frequencies are separated by adequate microwave bandwidth to accommodate the signal bandwidth shifted by a heterodyne difference frequency. The difference frequency thus comprises a fraction of the optical frequency spacing.

Multiple transmitter lasers 401–403 are utilized in this embodiment, each of which may carry a SDM microwave spectrum (or a single high frequency TDM transmission). Each laser is stabilized to a known optical frequency referenced to the fiber optic resonator 406. Feedback electronics are utilized to control the free spectral range of the fiber resonator 406 by controlling its temperature, and the absolute wavelength of each respective laser 401–403 is controlled by feedback to its respective injection current control. The various feedback signals are derived at different frequencies and the bandpass filter network demultiplexes these signals and directs each one to the appropriate laser control circuit.

The free spectral range of the fiber optic resonator 406 is locked to a microwave frequency and the WDM lasers 401–403 are locked to known optical frequencies referenced to that resonator 406. One such known optical frequency (i.e., mode) is referenced to an absolute optical frequency and all other mode numbers are determined relative to the absolute optical frequency. The generation of the absolute optical frequency and the locking of the free spectral range may be accomplished as described in U.S. Pat. No. 5,717,708 issued in the name of the present inventor, and using the techniques described by Hall (*Optical Heterodyne Saturation Spectroscopy*, Hall et al., Appl. Phys. Lett., November 1981) to lock this reference laser to an absolute optical frequency reference (e.g., rubidium) and/or the technique described by DeVoe and Brewer to stabilize and lock the free spectral range of the optical reference resonator to a known microwave frequency.

Alternatively, each of the WDM lasers 401–403 may simply be calibrated to its own known optical frequency (each with its own line-narrowing resonator 406). The prior art has taught a number of methods of determining known optical frequencies (e.g., wavemeters based upon Michelson interferometers, other types of interferometers based upon diffraction gratings, etc.). Other newer methods may also be used such as molecular resonance cells (e.g., rubidium cells for stabilizing a single known frequency, resonance vibration cells including acetylene cells which may be used to provide a multitude of reference frequencies, etc.).

The laser wavelengths of WDM lasers 401–403 are combined through a standard WDM multiplexing technique (e.g. the combination of optical circulators 408, 410 and fiber Bragg gratings 412, 414). A small sample of the WDM spectrum may be incident upon the fiber resonator 406 and the reflection is utilized as a feedback signal in order to derive the appropriate control signals. The majority of the WDM power output is transmitted through the single mode fiber network 416.

FIG. 4 further depicts a tunable local oscillator (LO) laser 418 that may be used to select a single transmitter laser frequency through the network 416 from the optical channel bank 404. This laser 418 is also referenced to an optical resonator, the free spectral range of which is also locked to a microwave oscillator. However the free spectral range of the LO based resonator is an integral fraction of the optical channel spacing (e.g. a factor of not less than three). Furthermore the microwave bandwidth on each optical carrier is chosen to be less than the free spectral range of the LO based resonator. In order to select a microwave band from the optically multiplexed transmission, the LO signal is locked to a mode of that resonator that is adjacent to the mode at which the desired signal wavelength is resonant. The LO laser 418 may be constructed substantially as described in U.S. Pat. No. 5,717,708 issued in the name of the present inventor.

Figure 5:
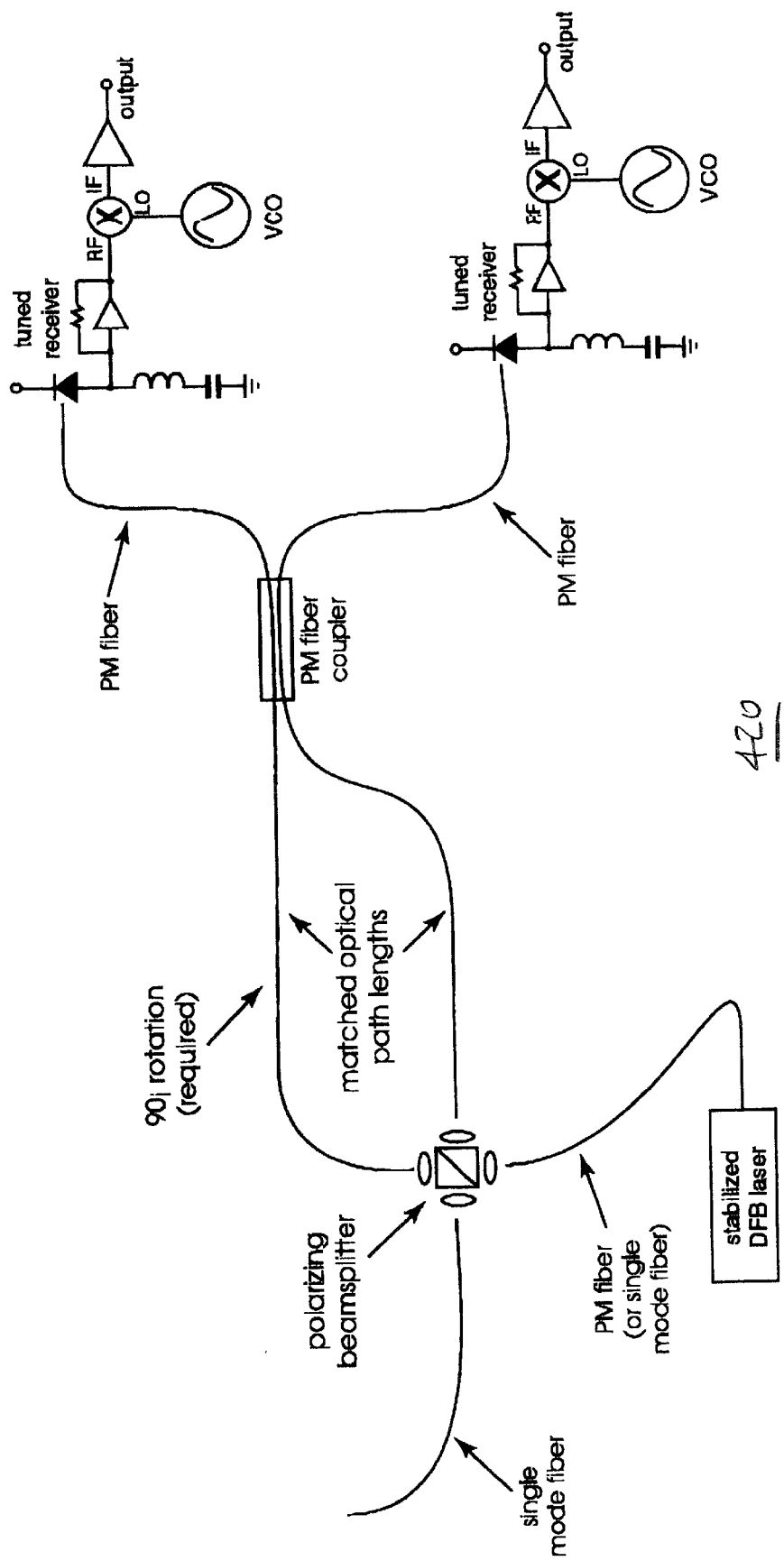
FIG. 5 depicts a polarizing alignment device under an illustrated embodiment which eliminates polarization dependent loss in the system while enabling distribution of the local oscillator laser power to multiple nodes of the network.

The receiver of FIG. 4 functions by introducing a local oscillator (LO) laser signal in the vicinity of, but not necessarily at, the physical location of the node 422, 424. In fact this design (FIG. 5) shows the LO laser power shared between two nodes 422, 424. The polarization alignment device comprises a polarization beamsplitter 426 and a 50% PM fiber coupler 428. The input PM fiber 430 from the LO 418 may be rotated 459 so that equal components of LO power excite both polarization axes. Both output polarizations are aligned to the same polarization axis of the PM fibers (e.g. the slow axis). One of the PM fibers 432 is rotated 902 so that a single polarization is coupled in the 50% PM fiber coupler 428. Although the signal input is arbitrarily polarized, the 50% fiber coupler 428 and 902 rotation of one of the PM fibers 432 ensures that equal components of signal power will propagate along both outputs of the beam polarization alignment device. As used herein, rotation means twisting one end of the PM fibers relative to the other end.

The polarization alignment thus ensures that the LO and signal fields are in a common state of polarization. Furthermore, once the polarization of the local oscillator (LO) laser is matched to that of the received laser, it becomes possible to reestablish the transmission in single mode fiber so that one or both of the nodes can be remotely located. Although the beam will once again become depolarized, the unknown state of elliptical polarization will be matched for both the LO and received laser beams.

Figure 8:
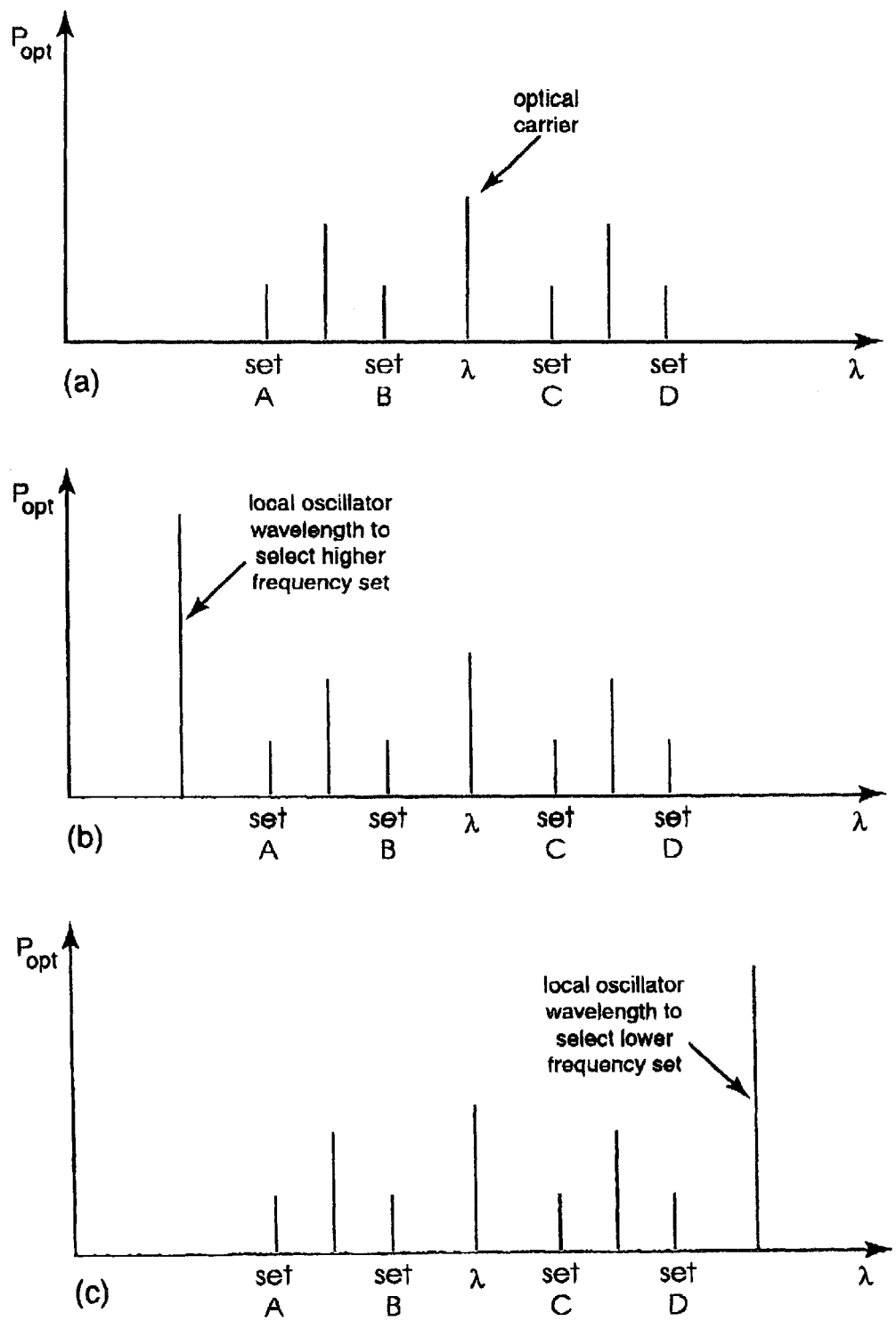
FIG. 8 depicts the optical frequency plan whereby a single optical carrier may be utilized to carry four sets of microwave subcarriers.

A heterodyne difference frequency is detected in detectors 438, 440 of the tuned receivers 422, 424. A final stage microwave demodulation within mixers 434, 436 returns the communications signal to baseband. This final mixer stage 434, 436 also serves to select one of the two sets of microwave subcarriers that are detected by detectors 438, 440 within the bandwidth of the bandpass filter of the tuned receiver. Thus each optical wavelength can carry up to four sets of microwave subcarriers (FIG. 8a). The lower frequency set is chosen by tuning the LO laser to the LO resonator mode below the desired carrier (FIG. 8b). Conversely the higher frequency set is chosen by tuning the LO laser to the LO resonator mode above the desired carrier (FIG. 8c).

Figure 6:
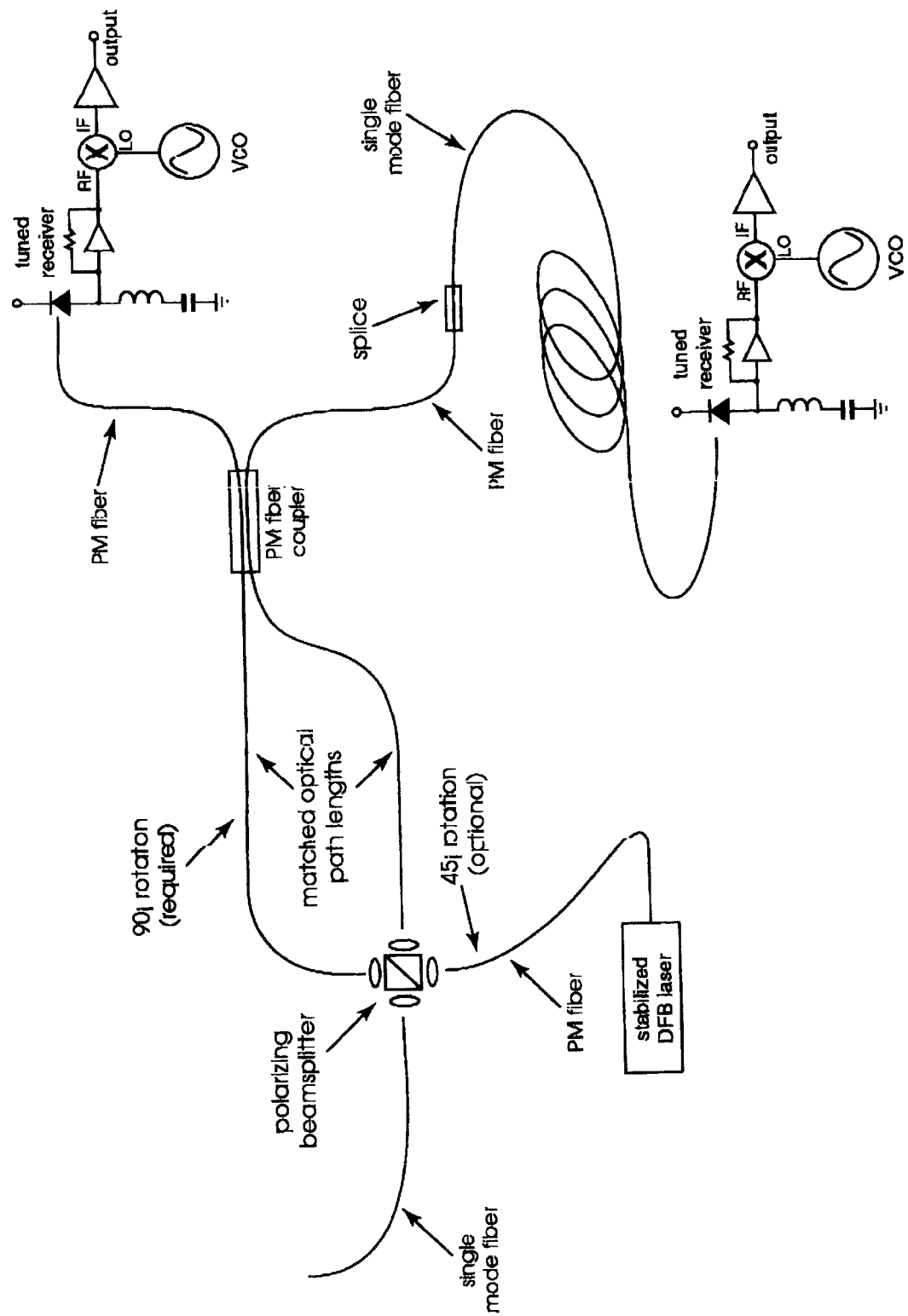
FIG. 6 depicts the polarization alignment device in the optional embodiment wherein a single mode fiber terminates the system after the linear polarization state has been recovered, establishing an unknown (and dynamic) state of elliptical polarization at the receiver.

FIG. 6 depicts an implementation of the invention in a coherent optical communications link wherein a single mode fiber is utilized to distribute the local oscillator laser and single laser power to the receiver without incurring polarization dependent loss due to the depolarizing properties of the single mode fiber. In order to accomplish this desired effect, it is necessary first to utilize a polarization preserving system (e.g., Panda fiber) to align the signal and local oscillator laser polarization to a common linear state. Once a common linear state is achieved, that state can be altered into any arbitrary state, without incurring polarization dependent loss provided that such an arbitrary state is precisely matched for the optical polarization of both signal and local oscillator laser fields.

One method of accomplishing this effect, as is depicted in FIG. 6, is to splice the Panda fiber to the single mode fiber utilizing a fusion splicer. In such an implementation, the Panda fiber will ensure that the same linear polarization state is launched into the single mode fiber for both signal and local oscillator lasers. The polarization mode dispersion will note cause polarization dependent loss because both signal an local oscillator fields remain in the same arbitrary state of polarization through the depolarizing fiber. In this manner, the benefits of the coherent optical system can be applied to the optical network utilizing standard single mode fiber which enabling distribution of the optically demodulation single power to multiple nodes of the fiber network.

In fact, the polarization restoring device is insensitive to the state of input polarization so that the device could function just as well to restore a common polarization to two input fields of arbitrary polarization states. (Note that the local oscillator laser input fiber to the polarization restoring device in FIG. 4 is indicated to be optionally a single mode fiber or polarization maintaining fiber. Also the rotation of the polarization maintaining fiber at the input to the polarization is entirely arbitrary.)

Figure 7:
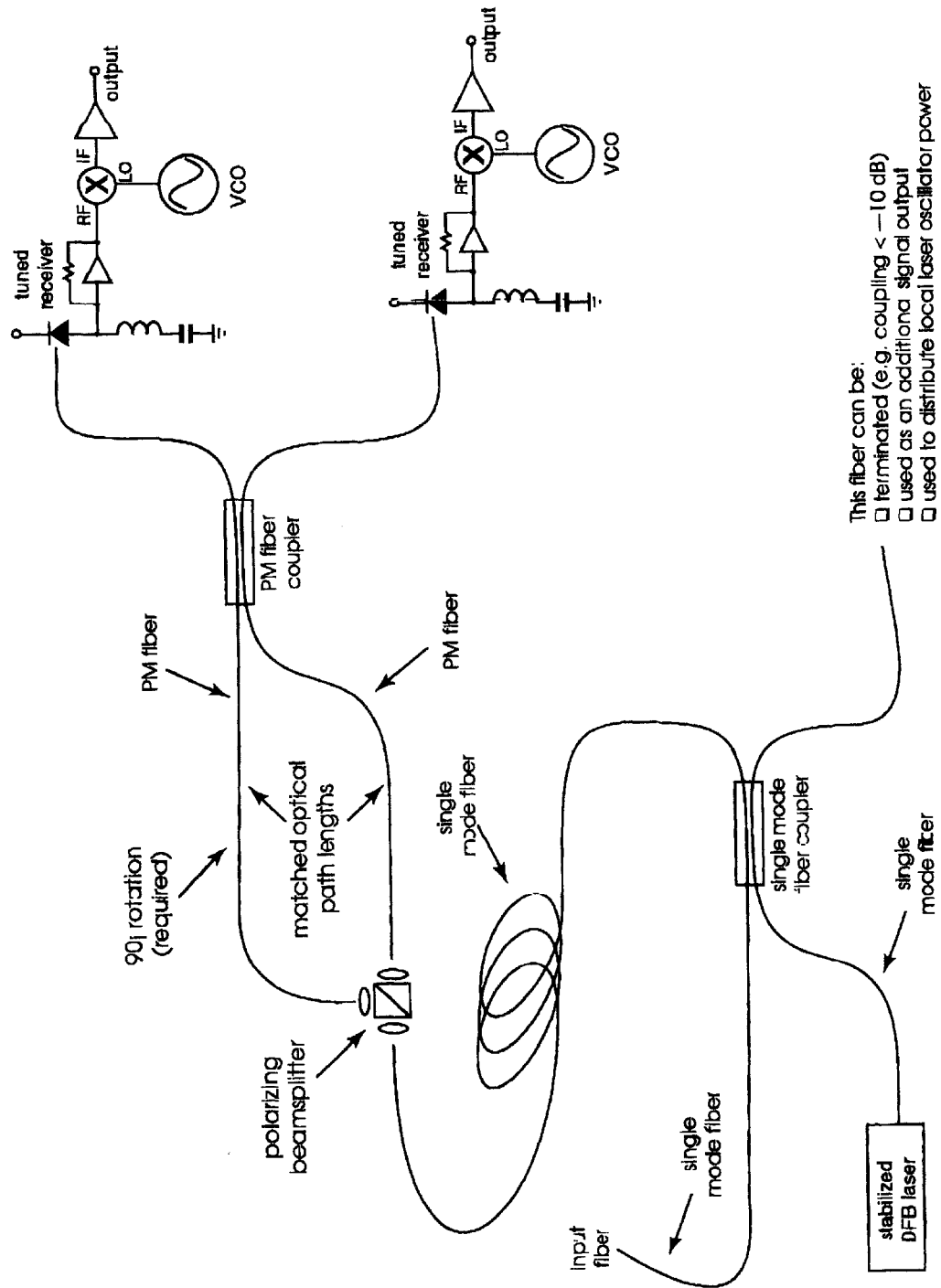
FIG. 7 depicts the polarization alignment device in the optional embodiment wherein a single mode fiber coupler is used to combine the signal and local oscillator laser fields and a single mode fiber transmission line is used to deliver the signal and local oscillator fields in independent and arbitrary polarization states to the polarization recovery device.

FIG. 7 depicts an illustrated embodiment wherein the signal and local oscillator laser fields are mixed within a single mode fiber so that the two fields are in arbitrary and independent polarization states at the input to the polarization recovery device. In this case only a single input fiber is required and the two fields are independently restored to a linear polarization state by the optics.

Thus it becomes apparent that the optical heterodyne techniques described above and depicted in FIG. 4 are a direct extension of the microwave mixing techniques discussed with regard to FIGS. 1–3. All of these techniques are pertinent to increasing bandwidth utilization on the network while maintaining substantially more flexibility and achieving considerably more cost effective deployment than that afforded by conventional WDM techniques. Furthermore, even in the most advanced implementations of the coherent optical heterodyne system, the system deployment in general does not cause the obsolescence of the existing terminal equipment infrastructure.

A specific embodiment of a method and apparatus for modulating a coherent beam according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of transmitting and receiving multiple RF/microwave subcarriers on a single optical wavelength over an optical link of a hybrid fiber optic/coaxial cable network comprising the steps of:

modulating a plurality of RF/microwave subcarrier frequencies with a respective communication signal;

modulating an optical carrier wave with the plurality of modulated RF/microwave subcarrier frequencies for transmission over a fiber optic portion of the hybrid fiber optic/coaxial cable network, where an occupied bandwidth of the modulated optical carrier is not limited by a bandwidth of a coaxial cable portion of the hybrid fiber optic/coaxial cable network;

detecting the plurality of RF/microwave subcarriers of the optical carrier wave and mixing those subcarriers with a first local oscillator (LO) frequency to create a new heterodyne IF frequency above the highest frequency component of the modulated signal spectrum of the detected subcarriers;

filtering an RF/microwave subcarrier frequency of the plurality of detected RF/microwave subcarriers utilizing a bandpass filter at an IF center frequency of the new IF frequency; and mixing the filtered RF/microwave subcarrier with a second local oscillator (LO) frequency to derive a difference frequency at a desired center frequency for propagation over the coaxial cable portion of the hybrid fiber optic/coaxial cable network.

2. A method of transmitting and receiving multiple RF/microwave subcarriers on several closely spaced optical wavelengths of a hybrid fiber optic/coaxial cable network comprising the steps of:

producing a plurality of RF/microwave subcarrier frequencies;

modulating each of the plurality of RF/microwave subcarrier frequencies with a plurality of information signals;

modulating each of a plurality of individual optical signals with at least some modulated subcarriers of the plurality of modulated RF/microwave subcarriers for transmission over a fiber optic portion of the hybrid fiber optic/coaxial cable network, where an occupied bandwidth of the modulated optical signals is not limited by a bandwidth of a coaxial cable portion of the hybrid fiber optic/coaxial cable network;

stabilizing the plurality of optical carrier signals to known optical frequencies;

mixing the plurality of optical signals at the receiver with a local oscillator (LO) laser tuned to a known optical frequency such that a heterodyne beat note between the LO laser and a carrier frequency corresponding to a desired signal component is at a center frequency of an IF above a highest frequency component of a modulated signal spectrum of the plurality of RF/microwave subcarriers;

filtering a limited bandwidth of RF/microwave subcarrier frequencies utilizing a bandpass filter at the IF center frequency to provide a filtered IF output; and mixing the filtered IF output with a local oscillator to derive a difference frequency at the desired center frequency for propagation over the cable portion of the hybrid fiber optic/coaxial cable network.

3. A method transmitting and receiving multiple RF/microwave subcarriers on a single optical wavelength over an optical link of a hybrid fiber optic/coaxial cable network comprising the steps of:

modulating a series of communications signals onto a series of RF/microwave subcarrier frequencies;

restricting a RF modulation bandwidth of the series of RF/microwave subcarrier frequencies such that mixing of a detected RF spectrum with a local oscillator (LO) frequency to create a new heterodyne IF frequency in a desired frequency band causes the difference frequencies of one detected band that occur at a same frequency as the sum frequencies from another band to fall outside the desired frequency band;

modulating a single optical carrier wave of a fiber optic portion of the hybrid fiber optic/coaxial cable network by a full spectrum of RF/microwave signals defined by the modulated series of RF/microwave subcarrier frequencies, where an occupied bandwidth of the modulated optical carrier is not limited by a bandwidth of a coaxial cable portion of the hybrid fiber optic/coaxial cable network;

detecting the full spectrum of RF/microwave subcarrier frequencies and mixing those subcarrier frequencies with the LO to create a new heterodyne IF frequency in the desired frequency band for propagation over a subsequent network element;

filtering the detected RF/microwave subcarrier frequencies within a coaxial cable portion of the hybrid fiber optic/coaxial cable network at a desired center frequency of the desired frequency band by utilizing a bandpass filter at the IF center frequency (or any other type of filter) that eliminates those frequencies at which difference frequencies of one detected band may occur at a same frequency as sum frequencies from another band over a full range of desired LO frequencies.

4. A method of transmitting and receiving multiple RF/microwave subcarriers on several closely spaced optical wavelengths of a hybrid fiber optic/coaxial cable network comprising the steps of:

modulating a series of communication signals on a series of RF/microwave subcarrier frequencies;

modulating each of several individual optical sources by independent and exclusive series of communication signals so that each optical frequency carries a full spectrum of RF/microwave signals comprising the series of subcarrier frequencies for transmission over a fiber optic portion of the hybrid fiber optic/coaxial cable network, where an occupied bandwidth of the modulated optical signals is not limited by a bandwidth of a coaxial cable portion of the hybrid fiber optic/coaxial cable network;

restricting an RF modulation bandwidth such that mixing of an optical signal spectrum with an optical frequency to create a new heterodyne IF frequency in the desired frequency band causes difference frequencies of one detected band that occur at a same frequency as sum frequencies from another band to fall outside of the desired frequency band;

stabilizing the multiple optical carrier signals to known optical frequencies;

mixing the optical signal at a receiver with a local oscillator (LO) laser tuned to a known optical frequency to create a new heterodyne IF frequency in the desired frequency band for propagation over the subsequent network element; and filtering the RF/microwave subcarrier frequencies at a desired center frequency of the new IF frequency by utilizing a bandpass filter at the IF center frequency (or any other type of filter) that rejects those frequencies at which the difference frequencies of one detected band may occur at the same frequency as the sum frequencies from another band over the full range of desired LO frequencies for propagation of the filtered RF/microwave subcarrier frequencies over the coaxial cable portion of the hybrid fiber optic/coaxial cable network.

* * * * *